United States Patent [19]

Grosskopf et al.

[11] Patent Number: 5,782,495
[45] Date of Patent: Jul. 21, 1998

[54] HANGER LABEL

[75] Inventors: Glenn A. Grosskopf, Lake Zurich, Ill.; Carl W. Treleaven, Greensboro, N.C.; Robert L. Pavetto, Palatine, Ill.

[73] Assignee: Westlake Ventures, L.L.C., Greensboro, N.C.

[21] Appl. No.: 584,622

[22] Filed: Jan. 11, 1996

[51] Int. Cl.$^6$ .................................................. B42D 15/00
[52] U.S. Cl. .................................................. 281/81; 281/81
[58] Field of Search .................. 215/100 A; 283/81, 283/900; 40/306, 310, 312

[56] References Cited

U.S. PATENT DOCUMENTS

| | | | |
|---|---|---|---|
| 999,961 | 8/1911 | Colas . | |
| 2,135,236 | 11/1938 | Koppelman | 229/90 |
| 2,362,523 | 11/1944 | Armstrong, Jr. et al. | 215/1 |
| 2,635,604 | 4/1953 | Fredrickson | 128/272 |
| 3,016,224 | 1/1962 | Hall | 248/205 |
| 3,231,919 | 2/1966 | MacDonald | 15/174 |
| 3,387,732 | 6/1968 | Jellies | 215/100 |
| 3,593,443 | 7/1971 | Demetrius, Jr. | 40/2 R |
| 3,635,367 | 1/1972 | Morita et al. | 215/100 A |
| 3,744,658 | 7/1973 | Fujio | 215/100 A |
| 3,822,492 | 7/1974 | Crawley | 40/2 |
| 3,851,790 | 12/1974 | Kasper | 220/85 R |
| 3,884,443 | 5/1975 | McMaster | 248/467 |
| 3,893,495 | 7/1975 | Stanifer | 150/52 R |
| 4,460,143 | 7/1984 | Dhama | 248/359 |
| 4,462,538 | 7/1984 | Gendron | 229/68 R |
| 4,479,838 | 10/1984 | Dunsim et al. | 156/247 |
| 4,526,404 | 7/1985 | Vazquez | 283/79 |
| 4,796,937 | 1/1989 | Andrea | 294/31.2 |
| 4,832,301 | 5/1989 | Hiramoto et al. | 248/359 H |
| 4,847,130 | 7/1989 | Cooper | 428/40 |
| 4,948,000 | 8/1990 | Grabenkort | 215/12.2 |
| 4,964,512 | 10/1990 | Ingram et al. | 206/459 |
| 4,964,513 | 10/1990 | Ingram et al. | 206/459 |
| 5,135,125 | 8/1992 | Andel et al. | 215/100 A |
| 5,172,936 | 12/1992 | Sullivan et al. | 283/81 |
| 5,182,152 | 1/1993 | Ericson | 428/42 |
| 5,227,209 | 7/1993 | Garland | 428/40 |
| 5,238,720 | 8/1993 | Yolkman | 428/40 |
| 5,271,642 | 12/1993 | Jahier et al. | 283/81 |
| 5,284,363 | 2/1994 | Gartner et al. | 283/81 |
| 5,329,713 | 7/1994 | Lundell | 40/310 |
| 5,350,612 | 9/1994 | Stern et al. | 428/40 |
| 5,490,658 | 2/1996 | Coward et al. | 248/683 |
| 5,542,634 | 8/1996 | Pomerantz | 248/214 |

FOREIGN PATENT DOCUMENTS

| | | | |
|---|---|---|---|
| 349670 | 9/1990 | European Pat. Off. | G09F 3/02 |
| 0390952 | 6/1994 | European Pat. Off. . | |
| 0356574 | 11/1994 | European Pat. Off. . | |
| 1460738 | 10/1966 | France . | |
| 2806391 | 2/1978 | Germany | B65D 25/22 |
| 3631021 | 5/1988 | Germany | G09F 3/02 |
| 4321572 | 1/1995 | Germany . | |
| 408315 | 9/1966 | Switzerland . | |
| 1175296 | 12/1969 | United Kingdom | A47F 5/00 |
| 1309950 | 9/1973 | United Kingdom . | |
| 1309950 | 3/1994 | United Kingdom | F16L 3/02 |

*Primary Examiner*—Willmon Fridie, Jr.
*Attorney, Agent, or Firm*—Rhodes, Coats & Bennett, L.L.P.

[57] ABSTRACT

The present invention is directed to a label for displaying information regarding a bottle or the like and for suspending the bottle from a support. The label includes a bottom panel having an upper surface and a lower surface. An adhesive layer is disposed on the lower surface of the bottom panel for securing the label to the bottle. A hanger flap is connected with the bottom panel by a fold along an edge of the bottom panel, the hanger flap overlying the upper surface of the bottom panel and defining an opening arranged and configured to receive the support.

30 Claims, 6 Drawing Sheets

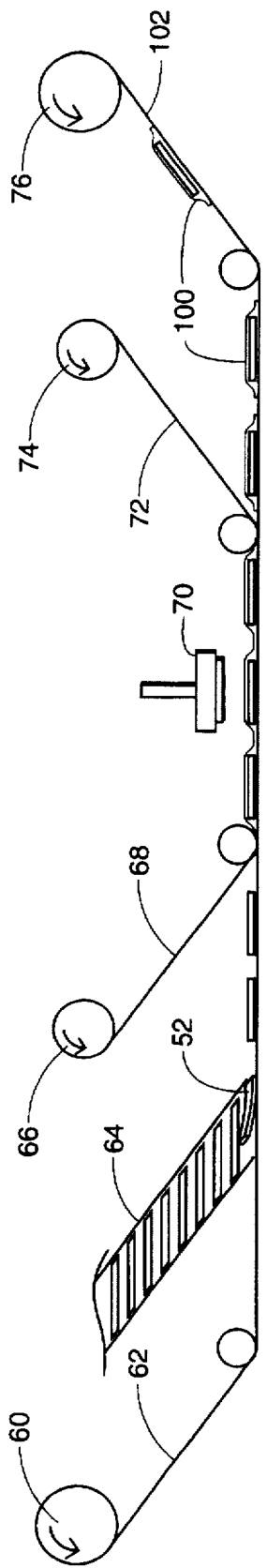
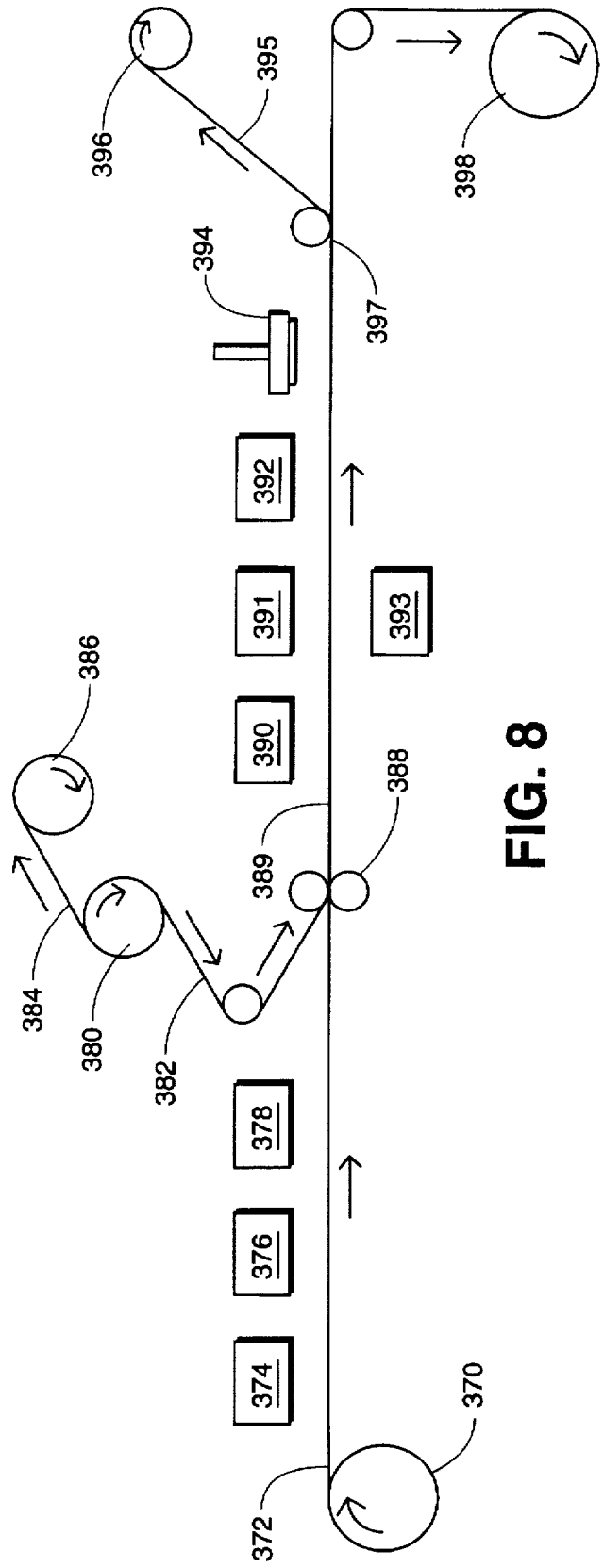
FIG. 7
FIG. 8

HANGER LABEL

FIELD OF THE INVENTION

The present invention is directed to a label for applying to a bottle, bag, or like container, and more particularly, to a label for displaying information regarding the container or its contents and having means integrally formed therewith for hanging the container.

BACKGROUND OF THE INVENTION

In certain applications, for example intravenously administered medicines, it is necessary to hang a bottle, bag or like container from a support. Particularly in the case of pharmaceutical products, it is necessary as well to substantially permanently apply to the bottle or bag regulatory information regarding the contents of the bottle and the usage thereof.

Several designs have been used to meet the above noted requirements. In the case of a bag, the bag may often be formed with an integral handle without substantial additional cost. This is often not feasible in the case of a bottle. It is known to form the bottle in a special shape and to secure a cap to the bottle's end, the cap having a hanger. Such methods are relatively expensive to implement and typically interfere with handling of the bottle when not in use (e.g., the stability of the bottle when standing upright is compromised by the irregularities of the cap).

It is also known to shrink wrap a liner about the bottle, the liner including a hanger. For example, U.S. Pat. No. 3,635,367 to Morita et al. and U.S. Pat. No. 3,744,658 to Fujio disclose permanently mounted hanging rings for suspending intravenous bottles. The respective hanging rings are formed in disk shaped members that fit against the bottom of the intravenous bottles and are secured thereto by protective liners. The disks are made of a rubber like material that permits the hanging rings to be bent away from the bottom of the bottles. The protective liners are made from a resin material that is heat contracted over portions of the sides and bottom of the bottles. Outer portions of the disks are also encased within the liners for permanently attaching the hanging rings to the bottles. The protective liners may also be used to attach labels to the sides of the bottles. These methods are also relatively expensive to implement.

A further means for providing hangers to bottles is to apply a self adhesive label formed from paper or film stock, the label including a hanger or handle integrally formed therewith. Examples of such labels are shown in U.S. Pat. No. 5,135,125 to Andel et al. and Federal Republic of Germany Document No. 3,631,021. Each of these labels suffer from significant drawbacks as well. The Andel et al. label requires that the user peel the handle away from the remainder of the label. Peeling the relatively thin layer from which the handle is formed away from the substrate to which it is adhered requires a significant degree of dexterity, particularly if the user is wearing protective gloves as is often the case in operating room and similar environments.

The German reference discloses a self adhesive label which has a projecting edge flap formed as a hanger. Although the German reference does disclose that a lightly adhesive coating may be used to permit releasable affixing of the flap to the bottom of the bottle, it appears that at least a portion of the flap will remain loose, and in any event, would extend over the bottom of the bottle when the bottle is not in use. This configuration poses a risk of the flap snagging on other items or otherwise hampering handling of the bottle. Further, labels according to the German reference would be difficult to apply to bottles because portions of the label must be secured to at least two differently oriented surfaces (i.e., the side and the bottom).

Accordingly, each of the above noted techniques for hanging a bottle or the like suffers from disadvantages in cost, usability, and/or handling. Further, these techniques do not provide for extended text. As a result, the amount of information which may be supplied on the label or the like is limited by the surface area of the bottle and the amount of surface area which may be practicably and desirably covered. Thus there exists a need for a means for labeling and hanging a bottle or the like which is cost effective to manufacture and implement, which is relatively easy to use, and which does not unduly adversely affect handling of the bottle. There exists a need for such a labeling means which may be adapted to provide extended text.

Often it is necessary to indicate on a patient record or the like the identity of or other information regarding the substance administered from an IV bottle as discussed above. Generally, the physician, nurse, or the like must transcribe the relevant information from the bottle's label to the patient record. Such exercise is often time consuming. Further, there is a risk that an error may occur in the transcription. Moreover, there is generally no way to verify if the correct information has been transcribed or rather an error has occurred.

Thus, there also exists a need for a hanger label which can be used to hang a bottle or the like which provides for efficient, accurate, and verifiable means for transferring information regarding the contents of the bottle to a patient record or the like.

SUMMARY OF THE INVENTION

The present invention is directed to a hanger label for displaying information regarding a bottle or the like and for suspending the bottle from a support. The label includes a bottom panel having an upper surface and a lower surface. An adhesive layer is disposed on the lower surface of the bottom panel for securing the label to the bottle. A hanger flap is connected with the bottom panel by a fold along an edge of the bottom panel, the hanger flap overlying the upper surface of the bottom panel and defining an opening arranged and configured to receive the support.

In the above described label the hanger flap may be releasably attached and in overlying relationship with the bottom panel. When the hanger flap is secured in overlying relationship with the bottom panel, the hanger flap is held in a stored position. When the hanger flap is released from the bottom panel, the hanger flap may be folded away from the bottom panel into an operative position for receiving the support.

A laminate cover may be provided overlying the hanger flap. The label may include at least one self adhesive secondary label releasably secured to the label. At least one additional panel may be secured to an edge of at least one of the bottom panel and the hanger flap.

The present invention is further directed to a label for displaying information regarding a bottle or the like and for suspending the bottle from a support including a bottom panel and an adhesive layer as described above. A hanger flap is connected with the bottom panel, the hanger flap defining an opening arranged and configured to receive the support. At least one self adhesive secondary label is releasably secured to the label.

In a more particular embodiment, a label includes a bottom panel having an upper surface and a lower surface with an adhesive layer disposed on the lower surface of the bottom panel for securing the label to the bottle. A hanger flap is connected with the bottom panel by a first fold along a first edge of the bottom panel, the hanger flap overlying the upper surface of the bottom panel and defining an opening arranged and configured to receive the support. A top panel is connected with the bottom panel by a second fold along a second edge of the bottom panel, the top panel overlying the hanger flap. The label further includes a detachable access coupling operative to secure the top panel in overlying relationship with the bottom panel. When the top panel is secured in overlying relationship with the bottom panel by the access coupling, the hanger flap is held between the top and bottom panels in a stored position. When the access coupling is detached, the hanger flap may be folded away from the bottom panel into an operative position for receiving the support.

In the foregoing label, a laminate cover may overlie the top panel. The top panel may be releasably attached to the bottom panel by an adhesive strip interposed between the upper surface of the bottom panel and the top panel, the adhesive strip resealably securing the top and bottom panels. Alternatively, a tear line may be formed in the top panel. The top panel may include an access tab extending from an edge thereof arranged and configured to facilitate lifting of the top panel away from the bottom panel. The label may further include at least one additional panel secured to an edge of at least one of the bottom panel and the top panel. A first indicia may be disposed on an upper surface of the top panel with a second indicia disposed on the upper surface of the bottom panel. The first and second indicias may be substantially identical. The label may further include at least one self adhesive secondary label releasably secured to the label.

In each of the label embodiments as described above including a laminate cover and a top panel, the laminate cover may include a marginal portion extending beyond the top panel and overlying the bottom panel. An adhesive strip may be interposed between the upper surface of the bottom panel and the marginal portion. The adhesive strip may resealably secure the upper surface of the bottom panel and the marginal portion of the laminate cover. Alternatively, a tear line may be formed in the laminate cover.

In each of the embodiments as described above including at least one self adhesive secondary label releasably secured to the label and also a top panel, the at least one self adhesive label may be releasably secured to a lower surface of the top panel. Secondary indicia is preferably disposed on the at least one secondary label.

An object of the present invention is to provide a means for hanging a bottle, bag, or like container from a support.

An object of the present invention is to provide such a means for hanging which further serves to display information regarding the bottle or the like or the contents thereof.

Moreover, an object of the present invention is to provide such a label which may be adapted to display extended text.

A further object of the present invention is to provide such a means for labeling and hanging a bottle which is relatively easy to use.

An object of the present invention is to provide such a means for labeling and hanging a bottle which does not unduly adversely effect handling of the bottle.

An object of the present invention is to provide a means for labeling and hanging a bottle which may be cost effectively manufactured and implemented.

Yet another object of the present invention is to provide a means for labeling and hanging a bottle or the like which provides for efficient, accurate, and verifiable means for transferring information regarding the contents of the bottle to a patient record or the like.

The preceding and further objects of the present invention will be appreciated by those of ordinary skill in the art from a reading of the figures and the detailed description of the preferred embodiment which follow, such description being merely illustrative of the present invention.

BRIEF DESCRIPTION OF THE DRAWINGS

FIG. 7 is a schematic, diagrammatic view of an apparatus for forming labels according to the first, second and third embodiments; and FIG. 8 is a schematic, diagrammatic view of an apparatus for forming constructions for incorporation into the labels of the third embodiment.

DETAILED DESCRIPTION OF THE DRAWINGS

Labels 100, 200, 300 according to the present invention as shown in the figures may be applied to a bottle 10. The labels serve to display information regarding the bottle and/or its contents and, moreover, to suspend the bottle from a conventional support 20, such as an IV stand. The labels are each preferably supplied on a release liner with a pressure sensitive adhesive on the rear surface thereof for securing the respective labels to the bottle. A hanger flap as detailed below is provided to receive the support 20. While the foregoing embodiments are discussed as applied to a bottle, it will be appreciated that the labels may be applied to bags and other types of packages or containers as well. However, the labels according to the present invention are especially well suited for use in conjunction with a bottle in that the geometries of bottles typically require a more or less precise balance to keep the bottles upright when suspended. Further, the support 20 may be any suitable support device.

Figure 1:
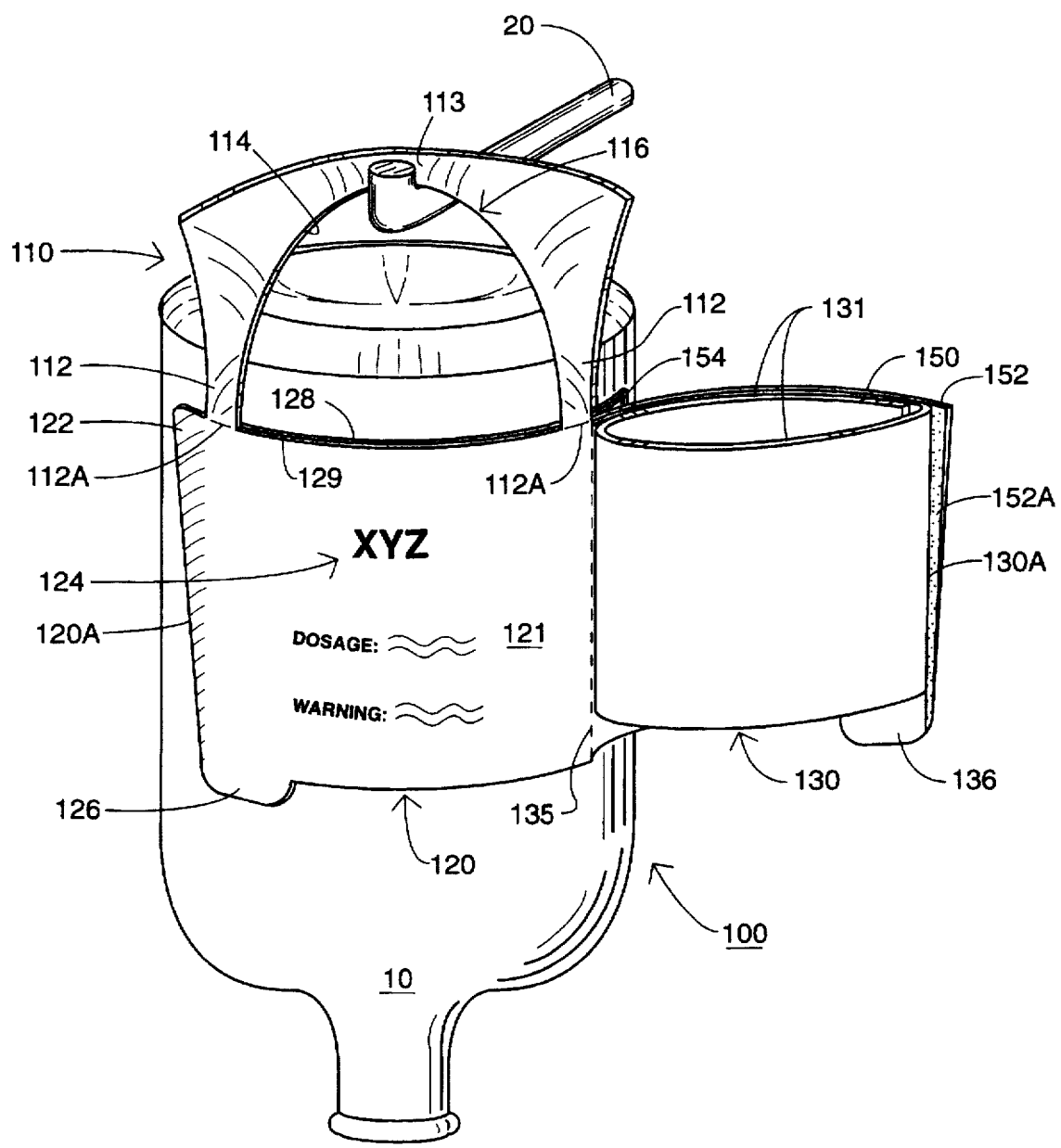
FIG. 1 is a perspective view of a label according to the present invention applied to a bottle and suspended from a support, the label in an open, operative position.
Figure 2:
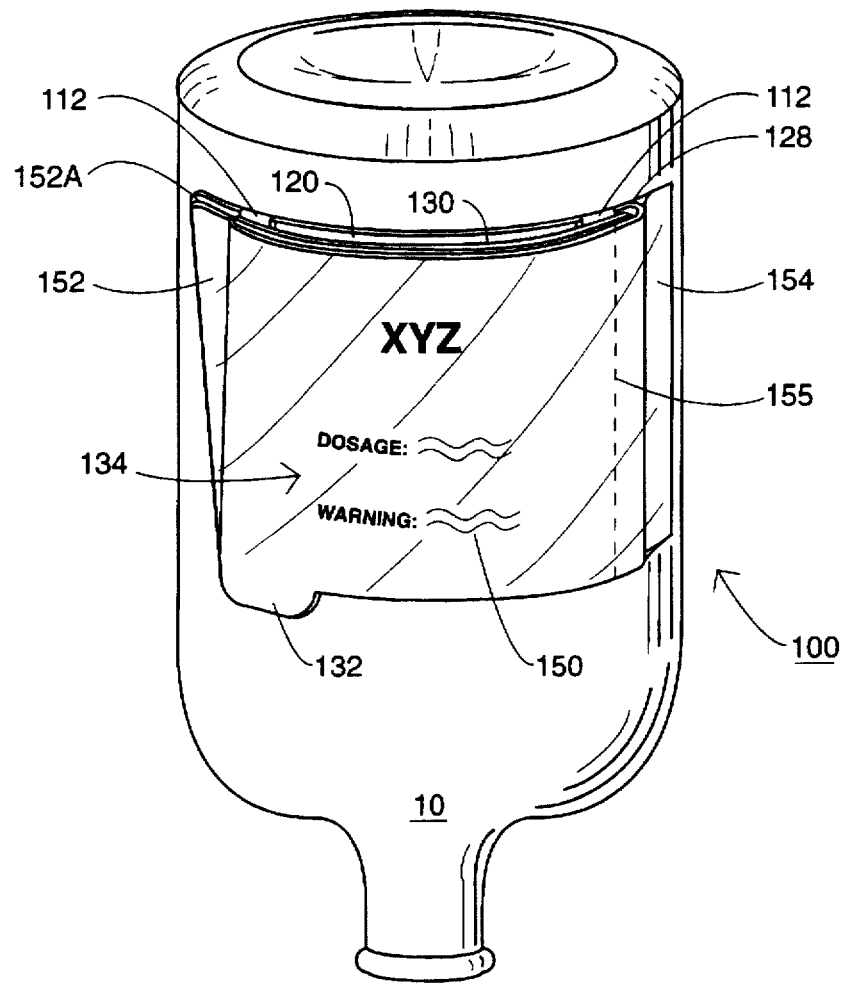
FIG. 2 is a perspective view of the label of FIG. 1 applied to a bottle and disposed in a closed, stored position.
Figure 3:
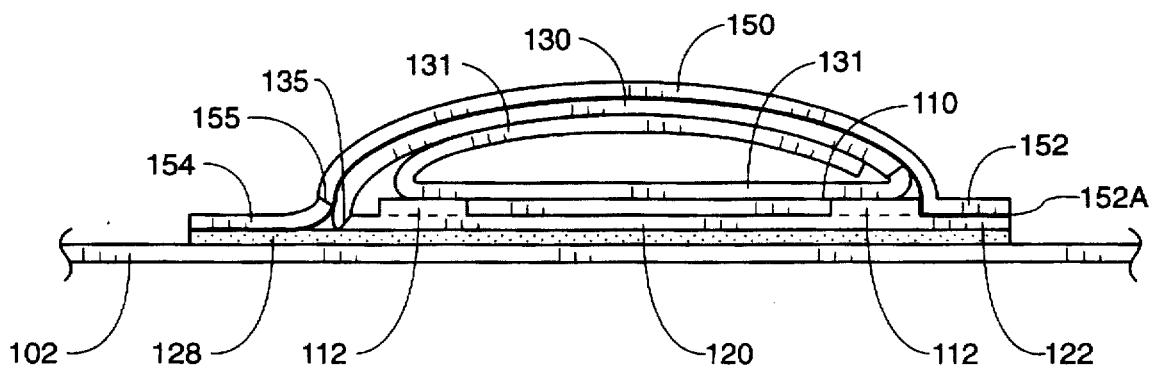
FIG. 3 is a side elevational view of the label of FIGS. 1 and 2 in the closed, stored position, and further wherein additional panels are shown extending from the top panel.

With reference to FIGS. 1–3, a label 100 according to a first embodiment is shown therein applied to bottle 10 which is suspended from support 20. Label 100 includes, generally, hanger flap 110, bottom panel 120, top panel 130, and laminate cover 150. Additional panels, for example panels 131, may be secured to either or both of the top and bottom panels, preferably the top panel. Bottom panel 120, and thus the remainder of the label, is secured to the bottle by means of pressure sensitive adhesive 128 coating the lower surface thereof. Self adhesive laminate cover 150 is secured to the upper surface of top panel 130 by an adhesive layer, and further, laminate cover margin 154 is secured to bottle 10 by the adhesive. Label 100 may be supplied on a release liner (e.g., a silicon coated paper stock web) 102 as shown in FIG. 3.

Preferably, hanger flap 110, bottom panel 120, top panel 130, and interior panels 131 are formed from a unitary piece or blank of film material. Suitable films include VALERON™ film available from Van Leer Films of Houston, Tex. and TYVEK™ film available from DuPont. Adhesive 128 is preferably a pharmaceutical grade permanent adhesive such as 3M product number 9447. Laminate cover 150 is preferably formed from polyester film with RM410 adhesive from 3M.

Bottom panel 120 has a main body portion 121, an upper edge 129, a marginal portion 122, and an access tab 126. Informational indicias 124 are printed on the upper surface of bottom panel 120. Preferably, a layer of release varnish such as a silicon varnish coats the upper surface of marginal portion 122. Suitable varnishes include L075 available from Paragon Ink of Connecticut Alternatively, the material from which the bottom panel is formed and the adhesive 152A may be chosen so as to be releasably adhered. Indicia 124 may include, for example, product name and instructions normally found on a product label or supplemental instructions as on an insert or outsert.

Hanger flap 110 is a generally inverted U-shaped member integrally formed with the bottom panel 120. The hanger flap 110 includes a pair of spaced sides 112 and a base portion 113. The inner edges of sides 112 and base portions 113 are curved to form an inner periphery 114 of flap 110 which, along with upper edge 129, define opening or aperture 116. Hanger flap 110 is foldable about folds 112A between an open or operative position as shown in FIG. 1 and a closed or stored position as in FIG. 2 (and also in FIG. 3). Preferably, ends 112 are spaced apart from one another such that they are disposed on diametric opposite sides of bottle 10 when in use.

As noted above, top panel 130 is preferably unitarily formed with bottom panel 120 and additional panels 131. Tear line 135 is formed along or adjacent a fold separating panels 120 and 130. Access tab 136 is positioned such that it is superimposed over access tab 126 when label 100 is in the closed, stored position of FIG. 2.

Laminate cover 150 includes marginal portion 152 having an adhesive layer 152A on its under surface. Marginal portion 152 is so configured that it overlies and is releasably adhered to marginal portion 122 of the bottom panel in the closed or stored position. The release varnish coating marginal portion 122 and adhesive 152A are preferably chosen such that the cover 150 is resealable. Tear line 155 (see FIG. 2) is formed in laminate cover 150 overlying tear line 135 of the top panel, whereby both top panel 130 and cover 150 may be removed together if desired.

Any number of additional panels (e.g., panels 131) for displaying additional indicia may be provided extending from any of the free edges of panels 120, 130. Preferably, the additional panels, if any, are secured to either or both of the opposed end edges 120A and 130A of panels 120 and 130, respectively. The additional panels may be folded in any suitable manner, preferably such that they are disposed between the top and bottom panels when the label is in the closed position of FIG. 2. Tear lines may be provided between the top and/or bottom panels and any additional panels so that the additional panels may be removed from the remainder of the label while the top and bottom panels remain secured to the bottle.

Label 100 may be used in the following manner. Label 100 is first applied to bottle 10 by means of adhesive 128 while in a stored position as shown in FIG. 2. Label 100 may remain in the closed position until the user chooses to hang the bottle and/or access the information housed within the label. When the user wishes to hang the bottle or access the information within the label, he or she may begin separating the upper and lower panels by sliding a finger between access tabs 126 and 136. The user then pulls top panel 130 sidewardly and away from bottom panel 120, causing marginal portions 122 and 152 to separate. The user may then lift hanger flap 110 up and away from bottom panel 120. The now extended hanger flap 110 may then be slid over support 20.

With label 100 in the open position as in FIG. 1, the user has several options. First, the user may inspect the indicias 124 or the information printed on the additional panels 131. The user may also remove top panel 130 and additional panels 131 secured thereto by tearing along tear lines 135, 155. Further, a tear line may be provided between the top panel and the first additional panel 131 so that panels 131 may be removed while the top panel remains attached to the bottle. Alternatively, the user may lay upper panel 130 down over bottom panel 120 again (first refolding or removing any additional panels secured thereto), resealing marginal portion 152 to marginal portion 122, with hanger flap 110 remaining in the extended, operative position. Alternatively, the user may remove the bottle from the support, fold hanger flap 110 downwardly about folds 112A, and fold upper panel 130 over bottom panel 120, thereby placing label 100 in the original, closed position.

Figure 4:
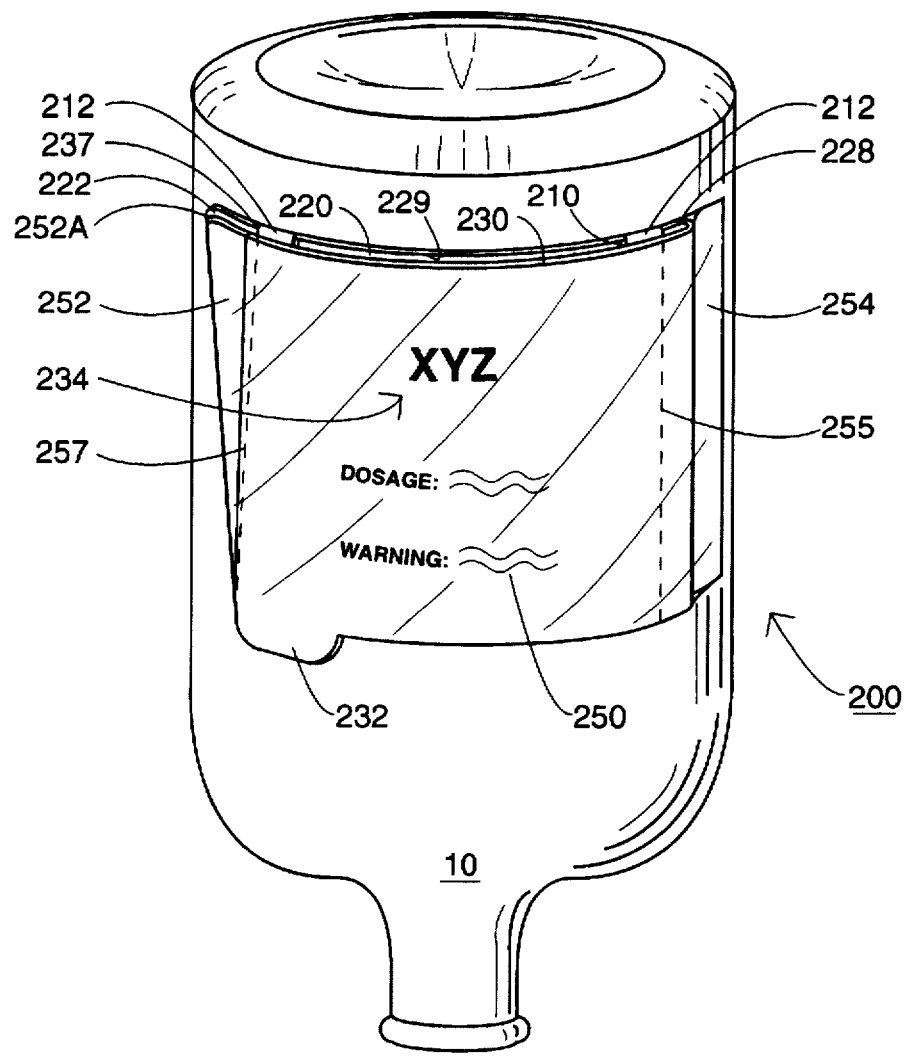
FIG. 4 is a label according to a second embodiment applied to a bottle and disposed in a closed, stored position.

With reference to FIG. 4, a label 200 according to a second embodiment is shown therein. Label 200 is substantially the same as label 100 except as discussed below. In particular, elements 210, 212, 220, 222, 228, 229, 230, 232, 234, 250, 252, 252A, 254, and 255 correspond to elements 110, 112, 120, 122, 128, 129, 130, 132, 134, 150, 152, 152A, 154, and 155. Similarly, additional panels (not shown) may be appended to top panel 230 and/or bottom panel 220. Label 200 differs from label 100 in that adhesive 252A and the materials of marginal portions 222 and 252 are chosen such that the marginal portions are substantially permanently adhered together by adhesive 252A. Label 200 may be opened by tearing along tear line 237 formed in top panel 230 and along tear line 257 formed in laminate cover 250.

Figure 6:
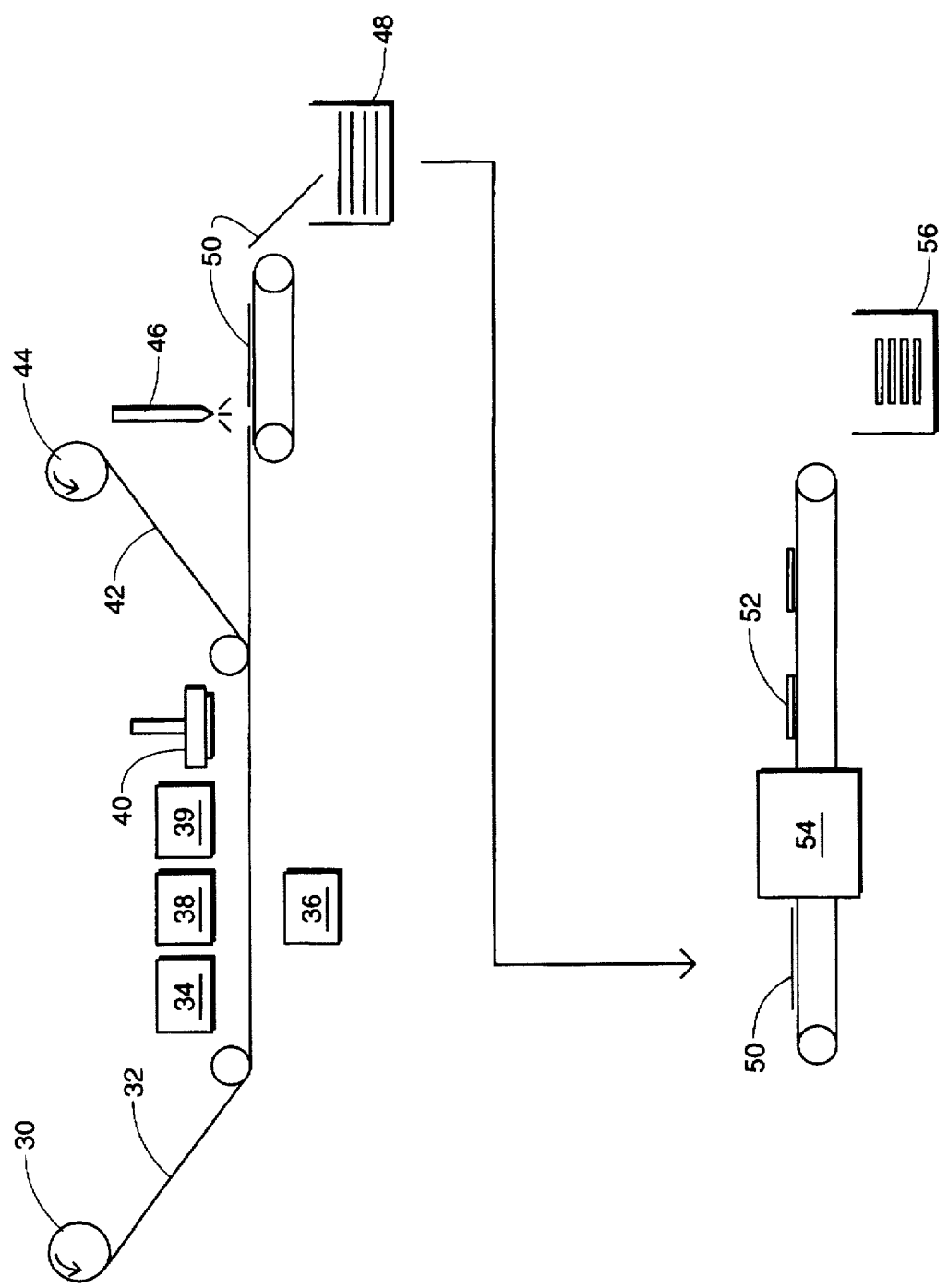
FIG. 6 is a schematic, diagrammatic view of an apparatus for forming constructions for incorporation in labels according to the first and second embodiments.

With reference to FIGS. 6 and 7, labels 100 and 200 according to the first and second embodiments may be formed by the following methods and apparatus. The methods will be described with regard to label 100, however, it will be appreciated that, except as discussed below, the methods and apparatus of manufacture for labels 100 and 200 will be the same. Labels 100, 200 may be formed using any type of standard printing process, for example, flexography, rotary letter press, web and sheet fed offset, or rotary gravure. Suitable apparatus include a Mark Andy Flexo Press manufactured by Mark Andy, Inc. of Chesterfield, Mo.

A web of suitable film stock 32, for example VALERON™ as described above, is unwound from unwind station 30. Print station 34 prints indicias 124 and any indicia to be disposed on the inner or lower surface of the top panel, if any. Print station 36 prints indicia 134. Either or both of print stations 34 and 36 may print on the areas which are to become hanger flap 110 as well as information to be disposed on additional panels, if any. Varnish print station 38 applies the varnish coating along the area which is to become marginal portion 122. The varnish coating is thereafter cured by curing station 39. Die cut station 40 forms cut lines in web 32 defining hanger flap 110, bottom panel 120, and top panel 130 (as well as any additional panels, e.g., panels 131) as a unitary blank. Tear line 135 may be formed by die cut station 40 or by a second die cut station (not shown). Waste matrix 42 consisting of the remainder of web 32 not forming a part of hanger flap 110, bottom panel 120, and top panel 130 is wound onto winding station 44. The portion of the web corresponding to opening 116 of the hanger flap may be removed in conventional fashion, for example, by collection in a bin associated with a male/ female die cutter or by a suction device. The web is thereafter sheeted by cutter 46 to form sheets or blanks 50. Sheets 50 are collected in magazine 48.

Sheets 50 are thereafter passed through folder 54 which serves to fold the sheets into constructions 52. First, hanger flap 110 is folded down onto bottom panel 120. If additional panels are appended to the bottom panel, these additional panels are consecutively folded in spiral or accordion configurations with each successive panel (from the edge of the bottom panel to the panel most remote from the bottom panel) being shorter than the previous panel. Thereafter, top panel 130 is folded over hanger flap 110. If any additional panels are appended to the top panel, these additional panels are folded in the same fashion as noted above with regard to the panels appended to the bottom panel. Suitable folder apparatus include a Machine by Oppenheimer (MBO) available from MBO America of Illinois or a G&K Folder available from Vijuk Equipment of Elmhurst, Ill. Constructions 52 may be collected in a magazine 56.

Turning now to FIG. 7, once constructions 52 have been formed, they are applied to a suitable web 62 including adhesive layer 128 (not shown in FIG. 7, see FIGS. 1–3) which is supplied from unwind station 60. Web 62 may be a transfer tape such as 3M Product No. 9447, 1 mil High Tenacity Tape with 320 Adhesive. The transfer tape preferably includes a release liner having an adhesive layer of pressure sensitive adhesive on the upper surface thereof. Transfer tapes having a second release liner layer located on the adhesive layer may also be used. Alternatively, web 62 may be a release liner to which pressure sensitive adhesive is applied to the upper surface thereof by an adhesive applicator, including just prior to application of constructions 52. Alternatively, the adhesive may be applied to the lower surface of the constructions 52.

Alternatively, web 62 may be a double coated tape consisting of release liner 102, a first adhesive layer coating the upper surface of the release liner, a carrier preferably formed from a polymeric material such as polypropylene substrate overlying the first adhesive layer, and a second adhesive layer overlying the carrier. Double coated tape as described may be formed by applying a pressure sensitive adhesive coating to the upper surface of a self adhesive polypropylene substrate disposed on a release liner, such as 3M Scotch Brand Tape Product No. 7214FL 2 mil polypropylene. Double coated tapes having a second release liner layer located on the second adhesive layer may also be used. Double coated tapes having carriers formed from polyester, polystyrene, polyethylene or other polyolefins may be used as well. A suitable product having a polyester carrier is Flexcon Flexmark Product No. DFM-100-Clear V-23/70 D/FK.

As a further alternative, web 62 may be a self adhesive stock web preferably consisting of a web of face stock releasably adhered to a release liner by means of a pressure sensitive adhesive coating. The self adhesive stock web may be, for example, high gloss paper with S246 adhesive available from Fasson. If a self adhesive stock web is used, an adhesive applicator would be provided to apply adhesive to the upper surface of the self adhesive stock web or to the lower surface of the bottom panels prior to application of the constructions 52 to the web. Notably, if labels 100 are formed using a self adhesive base stock web as just described, the resulting labels will not appear as described in the first and second embodiments, but rather would also include a layer of pressure sensitive adhesive and base stock interposed between the release liner or bottle and the bottom panel.

Constructions 52 are applied to web 62 by leaflet application station 64. Thereafter, self adhesive laminate web 68 is supplied by unwind station 66 and adhered by the adhesive thereof over constructions 52 and web 62. Die cutter station 70 cuts through laminate web 68 forming laminate covers 150. Tear line 155 may be formed by die cut station 70 or a further die cut station. Moreover, tear line 135 may be formed by die cut station 70 or a further die cut station. Waste matrix 72 including the portions of laminate web 68 outside laminate covers 150 is removed by winding station 74. The resulting labels 100 carried on release liner 102 may then be collected on a roll by winding station 76 or sheeted and stacked.

The methods and apparatus for forming labels 200 would differ from the above described methods and apparatus in the following ways. Varnish printing station 38 and curing station 39 may be eliminated in that no varnish coating is needed on marginal portion 222. Tear lines 237 and 257 may be formed by die cut station 70 or a further die cut station.

Figure 5:
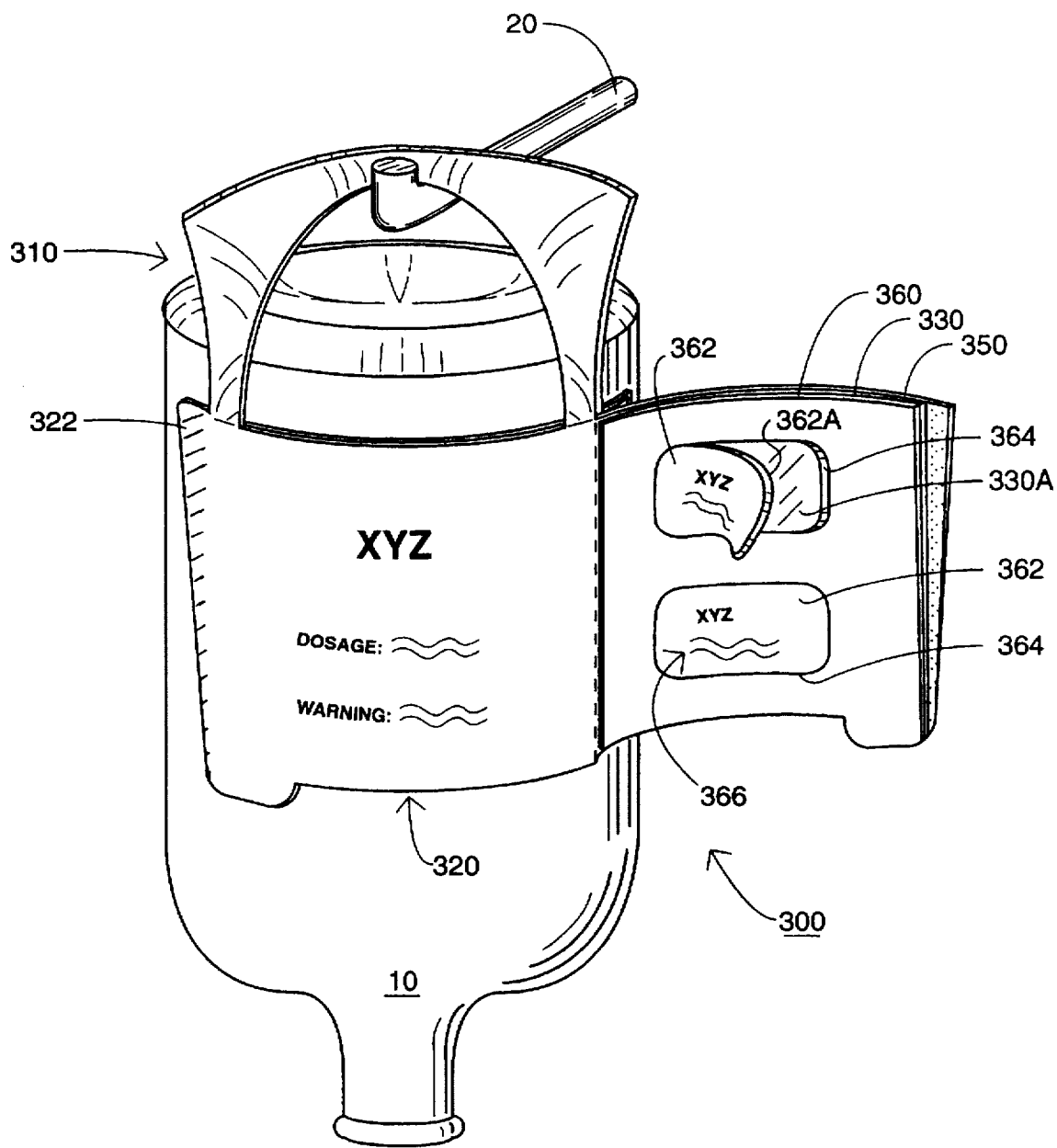
FIG. 5 is a perspective view of a label according to a third embodiment applied to a bottle and suspended from a support, the label disposed in an open position with a secondary label forming a part thereof partially removed.

With reference to FIG. 5, a label 300 according to a third embodiment is shown therein. Label 300 is substantially the same as label 100 except as follows includes hanger flap 310, bottom panel 320, and top panel 330. Label 300 further includes secondary self adhesive labels 362. Similarly, label 300 may be formed with any number of additional panels (not shown) secured to the free edges of the top and bottom panels and/or to the free edges of the secondary layer.

As in label 100 according to the first embodiment, self adhesive laminate cover 350 corresponding to laminate cover 150 is secured to the upper surface of top panel 330. Further, secondary layer 360, for example a film or paper stock, is adhered to the lower or inner surface of top panel 330 by adhesive 362A. Secondary labels 362 are defined by cut lines 364 formed in secondary layer 360. Secondary labels 362 include indicia 366. Release varnish 330A coats at least the portion of the lower surface of top panel 330 adjacent the adhesive 362A coating the under surface of each secondary label 362. Preferably, varnish 330A is selectively applied such that secondary labels 362 are releasably adhered to the top panel with the remainder of secondary layer 360 being more or less permanently adhered to the top panel. Alternatively, substantially the entire lower surface of top panel 330 may be coated with varnish 330A. Varnish also coats marginal portion 322 corresponding to marginal portion 122 of the first embodiment.

Label 300 may be used in the same manner as described above with respect to labels 100 and 200. In addition to the functions noted with regard to labels 100, 200, secondary labels 362 may be removed from the remainder of label 300 and secured by the pressure sensitive adhesive thereof to any desired substrate, for example, a patient record or the like. To this end, indicia 366 may represent information regarding, for example, information that might be included in the patient's medical record. Notably, because indicias 366 of the secondary labels may be printed concurrently with the indicias of the remainder of the label, correspondence between the information represented on the secondary labels and on the remainder of the label can be assured.

With reference to FIG. 8, the method and apparatus for forming labels 300 is similar to that used to form labels 100 and 200. A suitable web 372 corresponding to web 32 is supplied from unwinding station 370. Simultaneous with the supply of web 372, self adhesive stock web 382 is supplied from unwind stand 380. Web 372 ultimately forms hanger flap 310, bottom panel 320, and top panel 330. Web 382 ultimately forms secondary layer 360. Self adhesive web 382 may be provided as a self adhesive face stock of film or paper having a release liner, the release liner 384 simultaneously being removed to rewind stand 386. Self adhesive stock web 382 may be, for example, Fasson semigloss facestock with S246 adhesive and a 40 pound liner.

Web 372 first passes through print station 374 which prints any desired indicia on the upper surface of the bottom panel or the lower surface of the top panel. Web 372 then passes through varnish printing station 376 at which point varnish is applied to the portion of web 372 corresponding to marginal portion 322 and at least the portions of the lower surface of the top panel underlying the secondary labels (i.e., varnish 330A). Preferably, the varnish is selectively applied such that varnish 330A only underlies the secondary labels 362 and perhaps a relatively small amount of the remainder of secondary layer 360 near the peripheries of the secondary labels. Alternatively, the release varnish may be applied to the entire upper surface of web 372. Thereafter, web 372 passes through UV curing unit 378 in order to cure the applied varnish coating.

Webs 372 and 382 are married at nip rollers 388, thereby forming multilayer composite web 389. Notably, if the entire area of web 372 which ultimately becomes the inner surface of top panel 330 is coated with release varnish, then webs 372 and 382 are releasably adhered throughout the length of composite webs 389.

Composite web 389 is drawn through one or more print stations 390 to apply graphics and indicia including indicia 366. Composite web 389 may also pass through any number of print stations 393 to print graphics and other indicia on the lower surface of web 372 corresponding to the indicia disposed on the upper surface (i.e., the title page) of the top panel (not shown). Composite web 389 may also pass through varnish print station 391 which applies an overprint varnish to protect the indicias applied at print stations 390, 393. The coated composite web 389 then passes through UV curing unit 392 to cure the varnish.

Composite web 389 is die cut by die cut station 394 down to web 372 to form cut lines 364 which define secondary labels 362, and also to form the boundaries of secondary layer 360. In particular, this cut line defines the edge of secondary layer 360 adjacent bottom panel 320.

The portions of web 382 overlying the portions of web 372 corresponding to bottom panels 320 (i.e., waste matrix 395) is then removed by rewind station 396. Preferably, the die cut station also makes cut lines parallel to the length of the web and the cut lines transverse to the web do not extend as far as at least one side of the web. As a result, a lengthwise strip of face stock continues along the edge of the web so that the waste matrix 395 is continuous.

The resulting web construction 397 may thereafter be "sheeted" into individual strips and stacked or, alternatively, rewound onto rewind stand 398 and later cut into individual strips. The sheets which are ultimately formed may be folded and applied to one of the various adhesive webs and covered with a laminate cover, as described above with respect to the formation of labels 100 and 200.

It will be appreciated that the laminate covers of each of the labels, though preferred, are not required. The top panel may be adhered to the bottom panel. Further, the adhesive between the top and bottom panels may releasably or permanently join the panels. If releasable adhesive is used, the panels are preferably resealable. If permanent adhesive is used, a tear line may be formed in the top panel for access.

While a preferred embodiment of the present invention has been described, it will be appreciated by those of skill in the art that certain modifications may be made without departing from the scope of the present invention. For example, in each of the labels as described detachable adhesive may be applied between the hanger flap and the bottom panel to hold the hanger flap down until needed. If such provision is made, then the top panel and/or laminate cover may be omitted. All such modifications are intended to come within the scope of the claims which follow.

What is claimed is:

1. A hanger label for displaying information regarding a bottle or the like which also includes a hanger for suspending the bottle from a support, said label comprising:
   a) a bottom panel having an upper surface and a lower surface;
   b) an adhesive layer disposed on said lower surface of said bottom panel for securing said label to the bottle;
   c) a hanger flap connected with said bottom panel by a first fold along a first edge of said bottom panel, said hanger flap in a stored position overlying said upper surface of said bottom panel and having an opening therein, said opening so arranged and configured to receive the support in an operative position;
   d) a top panel connected with said bottom panel by a second fold along a second edge of said bottom panel, said top panel overlying said hanger flap in said stored position;
   e) said top panel being releasably attached to and in overlying relationship with said bottom panel;
   f) wherein, when said top panel is secured in overlying relationship with said bottom panel, said hanger flap is held between said top and bottom panels in said stored position, and, when said top panel is released from said bottom panel, said hanger flap may be folded away from said bottom panel into said operative position for receiving the support.

2. The label of claim 1 further including a laminate cover overlying said top panel.

3. The label of claim 1 wherein said top panel is releasably attached to said bottom panel by an adhesive strip interposed between said upper surface of said bottom panel and said top panel, said adhesive strip resealably securing said top and bottom panels.

4. The label of claim 1 wherein said top panel is releasably attached to said bottom panel by a tear line formed in said top panel.

5. The label of claim 1 wherein said top panel includes an access tab extending from an edge thereof arranged and configured to facilitate lifting of said top panel away from said bottom panel.

6. The label of claim 1 further including at least one additional panel secured to an edge of at least one of said bottom panel and said top panel.

7. The label of claim 1 further including a first indicia disposed on an upper surface of said top panel and a second indicia disposed on said upper surface of said bottom panel.

8. The label of claim 7 wherein said first and second indicias are substantially identical.

9. The label of claim 1 further including at least one self adhesive secondary label releasably secured to said label.

10. A hanger label for displaying information regarding a bottle or the like which also includes a hanger for suspending the bottle from a support, said label comprising:

11 a) a bottom panel having an upper surface and a lower surface;

b) an adhesive layer disposed on said lower surface of said bottom panel for securing said label to the bottle;

c) a hanger flap connected with said bottom panel by a first fold along a first edge of said bottom panel, said hanger flap in a stored position overlying said upper surface of said bottom panel and having an opening therein, said opening so arranged and configured to receive the support in an operative position;

d) a top panel connected with said bottom panel by a second fold along a second edge of said bottom panel, said top panel overlying said hanger flap in said stored position;

e) a laminate cover overlying said top panel;

f) said top panel being releasably attached to and in overlying relationship with said bottom panel;

g) wherein, when said top panel is secured in overlying relationship with said bottom panel, said hanger flap is held between said top and bottom panels in said stored position, and, when said top panel is released from said bottom panel, said hanger flap may be folded away from said bottom panel into said operative position for receiving the support.

11. The label of claim 10 wherein said laminate cover includes a marginal portion extending beyond said top panel and overlying said bottom panel, and wherein said top panel is releasably attached to said bottom panel by an adhesive strip interposed between said upper surface of said bottom panel and said marginal portion.

12. The label of claim 11 wherein said adhesive strip resealably secures said upper surface of said bottom panel and said marginal portion of said laminate cover.

13. The label of claim 10 wherein said top panel is releasably attached to said bottom panel by a tear line formed in said laminate cover.

14. The label of claim 10 wherein said top panel includes an access tab extending from an edge thereof arranged and configured to facilitate lifting of said top panel away from said bottom panel.

15. The label of claim 10 further including at least one additional panel secured to an edge of at least one of said bottom panel and said top panel.

16. The label of claim 10 further including a first indicia disposed on an upper surface of said top panel and a second indicia disposed on said upper surface of said bottom panel.

17. The label of claim 16 wherein said first and second indicias are substantially identical.

18. A hanger label for displaying information regarding a bottle or the like which also includes a hanger for suspending the bottle from a support, said label comprising:

a) a bottom panel having an upper surface and a lower surface;

b) an adhesive layer disposed on said lower surface of said bottom panel for securing said label to the bottle;

c) a hanger flap connected with said bottom panel by a first fold along a first edge of said bottom panel, said hanger flap in a stored position overlying said upper surface of said bottom panel and having an opening therein, said opening so arranged and configured to receive the support in an operative position;

d) a top panel connected with said bottom panel by a second fold along a second edge of said bottom panel, said top panel overlying said hanger flap in said stored position;

e) at least one self adhesive secondary label releasably secured to said label;

f) said top panel being releasably attached to and in overlying relationship with said bottom panel;

g) wherein, when said top panel is secured in overlying relationship with said bottom panel, said hanger flap is held between said top and bottom panels in said stored position, and, when said top panel is released from said bottom panel, said hanger flap may be folded away from said bottom panel into said operative position for receiving the support.

19. The label of claim 18 wherein said at least one self adhesive label is releasably secured to a lower surface of said top panel.

20. The label of claim 18 further including secondary indicia disposed on said at least one secondary label.

21. The label of claim 18 further including a laminate cover overlying said top panel.

22. The label of claim 21 wherein said laminate cover includes a marginal portion extending beyond said top panel and overlying said bottom panel, and wherein said top panel is releasably attached to said bottom panel by an adhesive strip interposed between said upper surface of said bottom panel and said marginal portion.

23. The label of claim 22 wherein said adhesive strip resealably secures said upper surface of said bottom panel and said marginal portion of said laminate cover.

24. The label of claim 21 wherein said top panel is releasably attached to said bottom panel by a tear line formed in said laminate cover.

25. The label of claim 18 wherein said top panel is releasably attached to said bottom panel by an adhesive strip interposed between said upper surface of said bottom panel and said top panel, said adhesive strip resealably securing said top and bottom panels.

26. The label of claim 18 wherein said top panel is releasably attached to said bottom panel by a tear line formed in said top panel.

27. The label of claim 18 wherein said top panel includes an access tab extending from an edge thereof arranged and configured to facilitate lifting of said top panel away from said bottom panel.

28. The label of claim 18 further including at least one additional panel secured to an edge of at least one of said bottom panel and said top panel.

29. The label of claim 18 further including a first indicia disposed on an upper surface of said top panel and a second indicia disposed on said upper surface of said bottom panel.

30. The label of claim 18 wherein said first and second indicias are substantially identical.

* * * * *

UNITED STATES PATENT AND TRADEMARK OFFICE
CERTIFICATE OF CORRECTION

PATENT NO. : 5,782,495
DATED : 21 July 1998
INVENTOR(S) : Glenn A. Grosskopf, Carl W. Treleaven, Robert L. Pavetto It is certified that error appears in the above-identified patent and that said Letters Patent is hereby corrected as shown below: On the title page, column 1, please replace "281/81; 281/81" with -- 283/81; 281/81 --.

Signed and Sealed this

Twenty-second Day of June, 1999

Attest:

Q. TODD DICKINSON

*Attesting Officer*  *Acting Commissioner of Patents and Trademarks*